(12) United States Patent
McCarty

(10) Patent No.: US 10,443,759 B2
(45) Date of Patent: Oct. 15, 2019

(54) NOISE ATTENUATION TRIM ASSEMBLY

(71) Applicant: FISHER CONTROLS INTERNATIONAL LLC, Marshalltown, IA (US)

(72) Inventor: Michael W. McCarty, Marshalltown, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 142 days.

(21) Appl. No.: 15/660,249

(22) Filed: Jul. 26, 2017

(65) Prior Publication Data

US 2019/0032815 A1    Jan. 31, 2019

(51) Int. Cl.
*F16K 47/08* (2006.01)
*F16K 3/24* (2006.01)

(52) U.S. Cl.
CPC .......... *F16K 47/08* (2013.01); *F16K 3/24* (2013.01)

(58) Field of Classification Search
CPC ..... Y10T 137/86718; Y10T 137/86734; Y10T 137/86791; Y10T 137/86799
USPC ..... 251/118; 138/40, 43; 137/625.28, 625.3, 137/625.33, 625.37, 625.38
See application file for complete search history.

(56) References Cited

U.S. PATENT DOCUMENTS

| | | | |
|---|---|---|---|
| 3,704,726 A * | 12/1972 | Lewis | F16K 47/08 137/625.3 |
| 6,095,196 A * | 8/2000 | McCarty | F15D 1/02 137/625.3 |
| 6,935,370 B2 | 8/2005 | McCarty et al. | |
| 9,291,282 B2 | 3/2016 | Fagerlund et al. | |
| 2005/0199298 A1* | 9/2005 | Farrington | F16K 47/08 137/625.37 |
| 2009/0183790 A1 | 7/2009 | Moore | |
| 2016/0341335 A1 | 11/2016 | Adams et al. | |
| 2017/0234440 A1* | 8/2017 | Detmers | F16K 3/34 251/118 |

* cited by examiner

*Primary Examiner* — Michael R Reid
(74) *Attorney, Agent, or Firm* — Marshall, Gerstein & Borun LLP

(57) ABSTRACT

A control valve trim assembly has a solid, one-piece unitary body having an inner surface and an outer surface. A plenum is formed within the body and is spaced apart from the inner surface and the outer surface. A plurality of first openings are formed in the inner surface of the body and are in fluid communication with the plenum via a corresponding first fluid passages formed through the body. A plurality of second openings are formed in the outer surface of the body and are in fluid communication with the plenum via a corresponding second fluid passages through the body.

14 Claims, 5 Drawing Sheets

NOISE ATTENUATION TRIM ASSEMBLY

FIELD OF THE DISCLOSURE

This disclosure relates generally to control valves and, more specifically, to improved noise attenuation trim assemblies for control valves.

BACKGROUND

In typical control valves, a trim assembly, such as a valve cage or valve cage and cage retainer, may provide guidance for a valve plug as the valve plug moves from a closed position in which the valve plug sealingly engages a valve seat to an open position in which the valve plug is disposed away from the valve seat. When the control valve is in the open position, fluid flows from an inlet, passes through a passage between the valve seat and the valve plug, passes through the trim assembly, and exits through an outlet. In addition to guiding the valve plug, a trim assembly can also be used for additional functions, such as noise attenuation.

The principles typically used to attenuate noise in a control valve using a trim assembly are: reduced jet size, staged pressure reduction, optimal low high and low pressure recovery, jet independence, and peak frequency shifting. However, due to manufacturing limitations, implementation of as many of these principles as possible was performed linearly, in series, and was primarily limited to radially plane geometry and required large outer diameter trim assemblies and wide trim assembly cross sections.

Referring to FIG. 1, a typical control valve 10 is shown. Control valve 10 generally includes a valve body 12 having an inlet 14, an outlet 16, and a passageway 18 disposed between inlet 14 and outlet 16. A valve seat 24 is disposed in passageway 18 between inlet 14 and outlet 16 and a solid trim assembly 22 is disposed within valve body 12. A fluid control member, such as valve plug 26, is positioned within valve body 12 and is disposed within trim assembly 22. Valve plug 26 interacts with the valve seat 24 to control or modulate fluid flow through the valve body 12 of control valve 10, such that valve plug 26 sealingly engages valve seat 24 in a closed position and is spaced away from valve seat 24 in an open position. A stem 28 is connected to valve plug 26 at one end and to an actuator 30 at another end. Actuator 30 controls movement of valve plug 26 within trim assembly 22. Trim assembly 22 is positioned adjacent valve seat 24 and proximate valve plug 26 to provide guidance for valve plug 26.

In traditional applications, trim assembly 22 has a plurality of radially extending passages 20 formed through a circumferential wall of trim assembly 22, which are used to attenuate the noise produced as the fluid passes through trim assembly 22. Passages 20 are spaced specifically such that the jets of fluid that are produced as the fluid exits passages 20 do not converge and produce aerodynamic noise. Trim assemblies 22 used in these types of fluid applications are typically used in a "flow up" orientation (e.g., the fluid enters the center of trim assembly 22 and passes from an inner surface to an outer surface of trim assembly 22) and the spacing of passages 20 that is crucial to reduce the aerodynamic noise is on the outer surface of trim assembly 22. The spacing of passages 20 on the inner surface of trim assembly 22 can also be important, as this spacing is used to keep sufficient space between passages 20 to not allow flow to pass through more passages 20 than desired for accurate flow characteristics throughout the travel of valve plug 26.

For solid trim assemblies 22 used in fluid applications where the process conditions produce aerodynamic noise as the fluid flows through control valve 11, drilled holes through the circumferential wall of trim assembly 22 are typically used to form passages 20. However, implementation of multiple noise attenuation principles, such as reduced jet size, staged pressure reduction, optimal low high and low pressure recovery, jet independence, and peak frequency shifting, is severely limited due to limitations of this manufacturing technique.

BRIEF SUMMARY OF THE DISCLOSURE

In accordance with one exemplary aspect of the present invention, a control valve trim assembly includes a solid, one-piece unitary body having an inner surface and an outer surface. A plenum is formed within the body and is spaced apart from the inner surface and the outer surface. A plurality of first openings are formed in the inner surface of the body and each of the first openings is in fluid communication with the plenum via a corresponding first fluid passage formed through the body. A plurality of second openings are formed in the outer surface of the body and each of the second openings is in fluid communication with the plenum via a corresponding second fluid passage through the body.

In further accordance with any one or more of the foregoing exemplary aspects of the present invention, a control valve trim assembly may further include, in any combination, any one or more of the following preferred forms.

In one preferred form, the control valve trim assembly further comprises a baffle positioned within the plenum, the baffle extending into the plenum between the first and second fluid passages.

In another preferred form, each of the first and second fluid passages has at least one radially extending portion and at least one longitudinally extending portion.

In another preferred form, the plurality of first and second openings are formed in a first section of the body and the plenum is formed in a second section of the body, longitudinally adjacent to the first portion.

In another preferred form, the plenum is annular.

In another preferred form, at least one surface of the plenum, opposite the first and second fluid passages, is arcuate.

In another preferred form, a control valve includes the control valve trim assembly and further comprises a valve body, a valve seat, and a valve plug. The valve body has in inlet and an outlet and the valve seat is positioned in a passageway of the valve body between the inlet and the outlet. The valve plug is positioned within the valve body and is moveable between an opened position and a closed position to modulate the flow of a fluid through the control valve and the control valve trim assembly is disposed within the valve body adjacent the valve seat and proximate the valve plug.

In accordance with another exemplary aspect of the present invention, a control valve trim assembly includes a body having an annular first section and a longitudinally adjacent annular second section and defines an inner surface and an outer surface. A plenum is formed within the second section of the body and is spaced apart from the inner surface and the outer surface. A plurality of first openings are formed in the inner surface of the first section of the body and each of the first openings is in fluid communication with the plenum via a corresponding first fluid passage formed through the body. A plurality of second openings are formed in the outer surface of first section of the body and each of the second openings is in fluid communication with the plenum via a corresponding second fluid passage through the body.

In further accordance with any one or more of the foregoing exemplary aspects of the present invention, a control valve trim assembly may further include, in any combination, any one or more of the following preferred forms.

In one preferred form, the body is a solid, one-piece unitary body.

In another preferred form, the first section comprises a cage and the second section comprises a cage retainer connected to the cage.

In another preferred form, the control valve trim assembly further comprises a baffle positioned within the plenum and extending into the plenum between the first and second fluid passages.

In another preferred form, each of the first and second fluid passages has at least one radially extending portion and at least one longitudinally extending portion.

In another preferred form, the plenum is annular.

In another preferred form, at least one surface of the plenum, opposite the first and second fluid passages, is arcuate.

In another preferred form, a control valve includes the control valve trim assembly and further comprises a valve body, a valve seat, and a valve plug. The valve body has in inlet and an outlet and the valve seat is positioned in a passageway of the valve body between the inlet and the outlet. The valve plug is positioned within the valve body and is moveable between an opened position and a closed position to modulate the flow of a fluid through the control valve and the control valve trim assembly is disposed within the valve body adjacent the valve seat and proximate the valve plug.

In accordance with yet another exemplary aspect of the present invention, a control valve trim assembly includes a body having an annular first section and a longitudinally adjacent annular second section and defines an inner surface and an outer surface. A plurality of first openings are formed in the inner surface of the first section of the body and a plurality of second openings formed in the outer surface of the first section of the body. Each of the first openings is in fluid communication with a corresponding second opening via a fluid passage formed through the body, which passes through the first section and the second section. Each of the fluid passages has at least one radially extending portion and at least one longitudinally extending portion.

In further accordance with any one or more of the foregoing exemplary aspects of the present invention, a control valve trim assembly may further include, in any combination, any one or more of the following preferred forms.

In one preferred form, the body is a solid, one-piece unitary body.

In another preferred form, the first section of the body is a cage and the second section of the body is a cage retainer connected to the cage.

In another preferred form, each of the fluid passages comprises a variable cross-sectional area.

In another preferred form, a control valve includes the control valve trim assembly and further comprises a valve body, a valve seat, and a valve plug. The valve body has an inlet and an outlet and the valve seat is positioned in a passageway of the valve body between the inlet and the outlet. The valve plug is positioned within the valve body and is movable between an opened position and a closed position to modulate the flow of a fluid through the control valve and the trim assembly is disposed within the valve body adjacent the valve seat and proximate the valve plug.

DETAILED DESCRIPTION

The control valve trim assemblies disclosed herein can be used in any fluid application, such as liquid or gas applications, and provide improved noise attenuation characteristics over traditional solid trim assembly designs by implementing multiple different noise attenuation principles and exploiting the dead-space not currently used in traditional designs. Some advantages of the trim assemblies are improved noise attenuation and smaller part size/cross section, which can lead to better flow vs. noise attenuation capability. In addition, positioning a plenum in the dead-space in the top of the trim assembly, which is typically not used by traditional designs, allows for a narrower cross-section and provides additional staging and drag on the fluid due to elongated fluid passages through the trim assembly, which provides more pressure drop.

Figure 1:
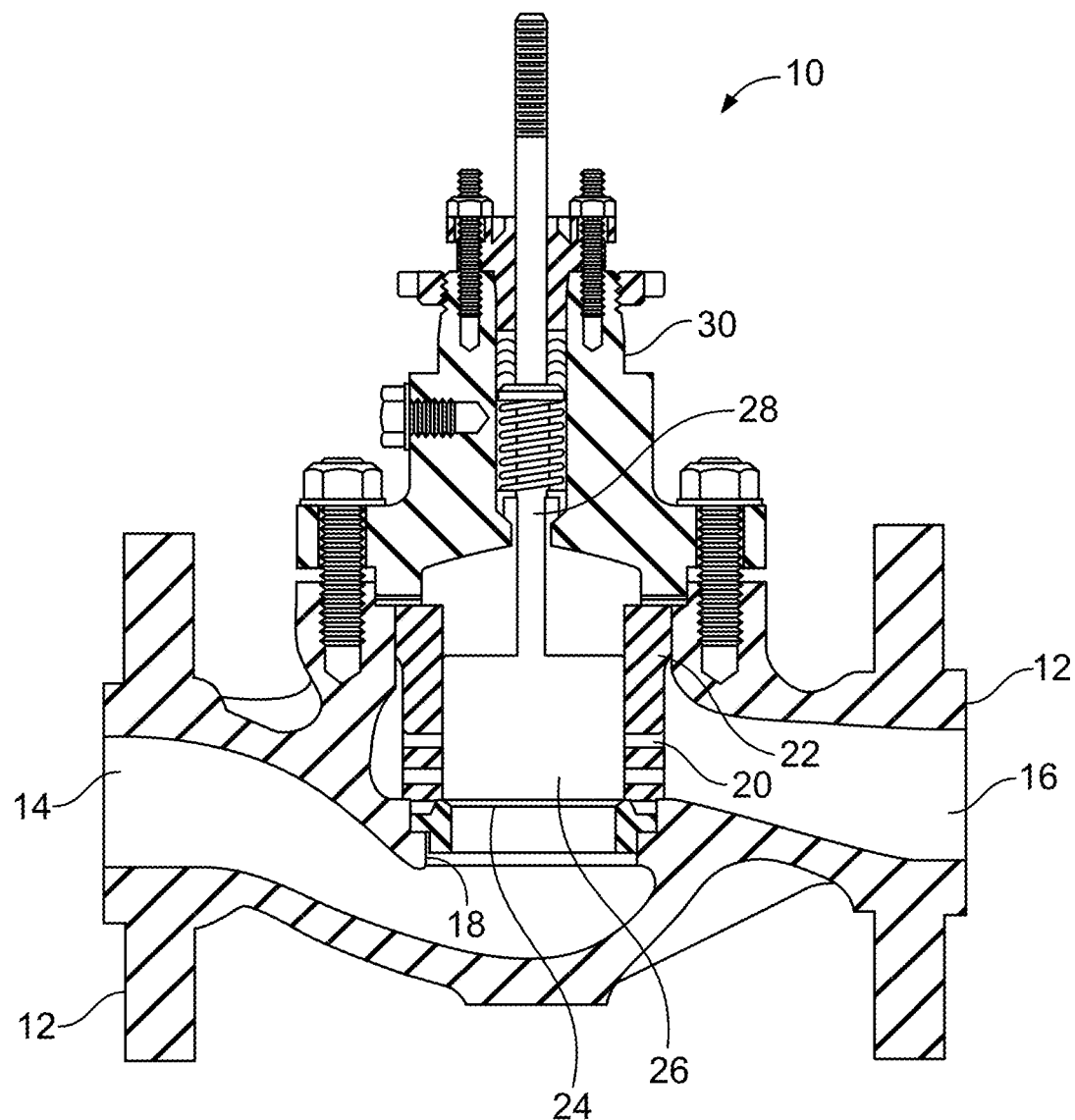
FIG. 1 is a cross-sectional view of an example control valve.
Figure 2:
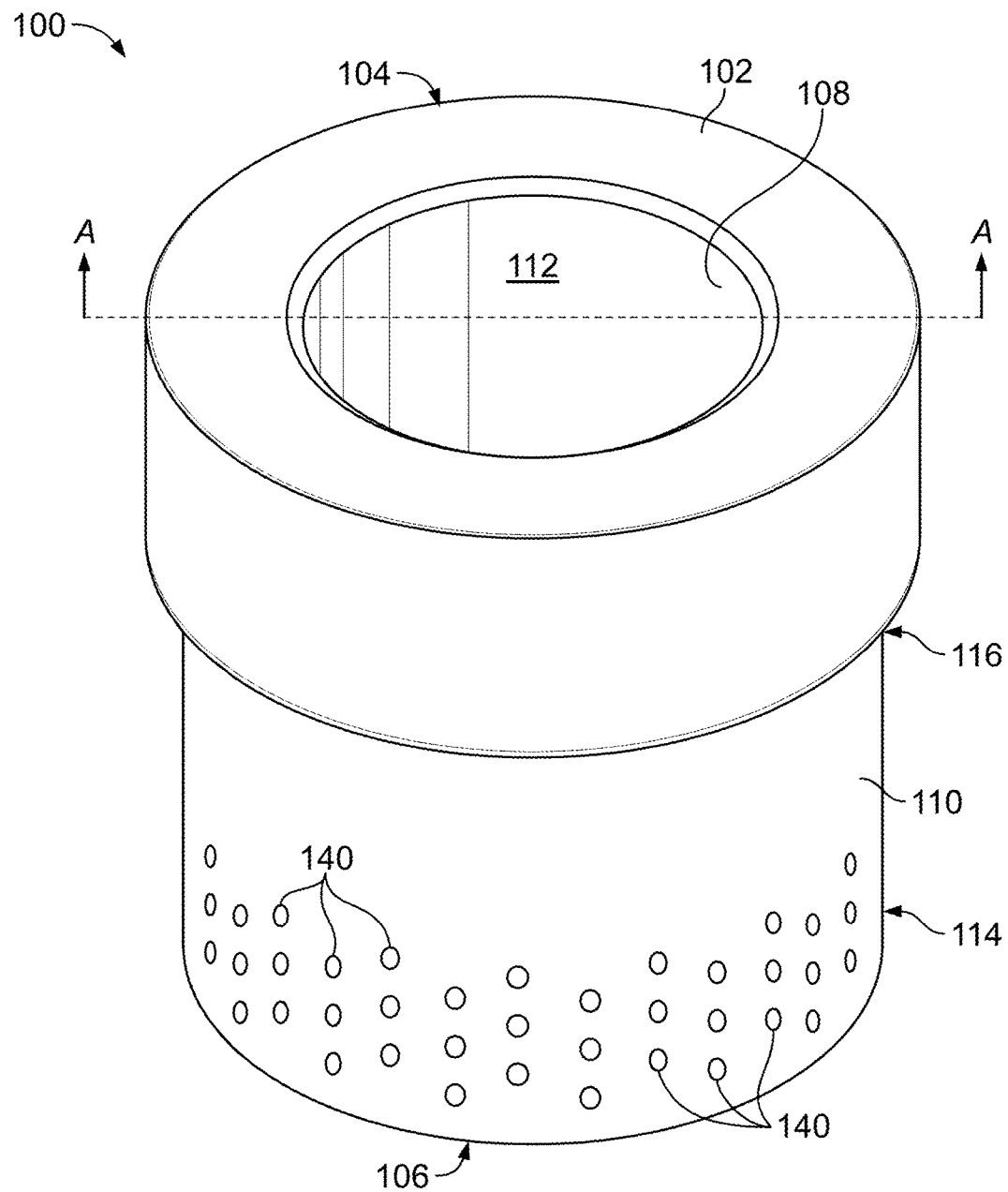
FIG. 2 is a perspective view of an example trim assembly that can be used with the control valve of FIG. 1.
Figure 3:
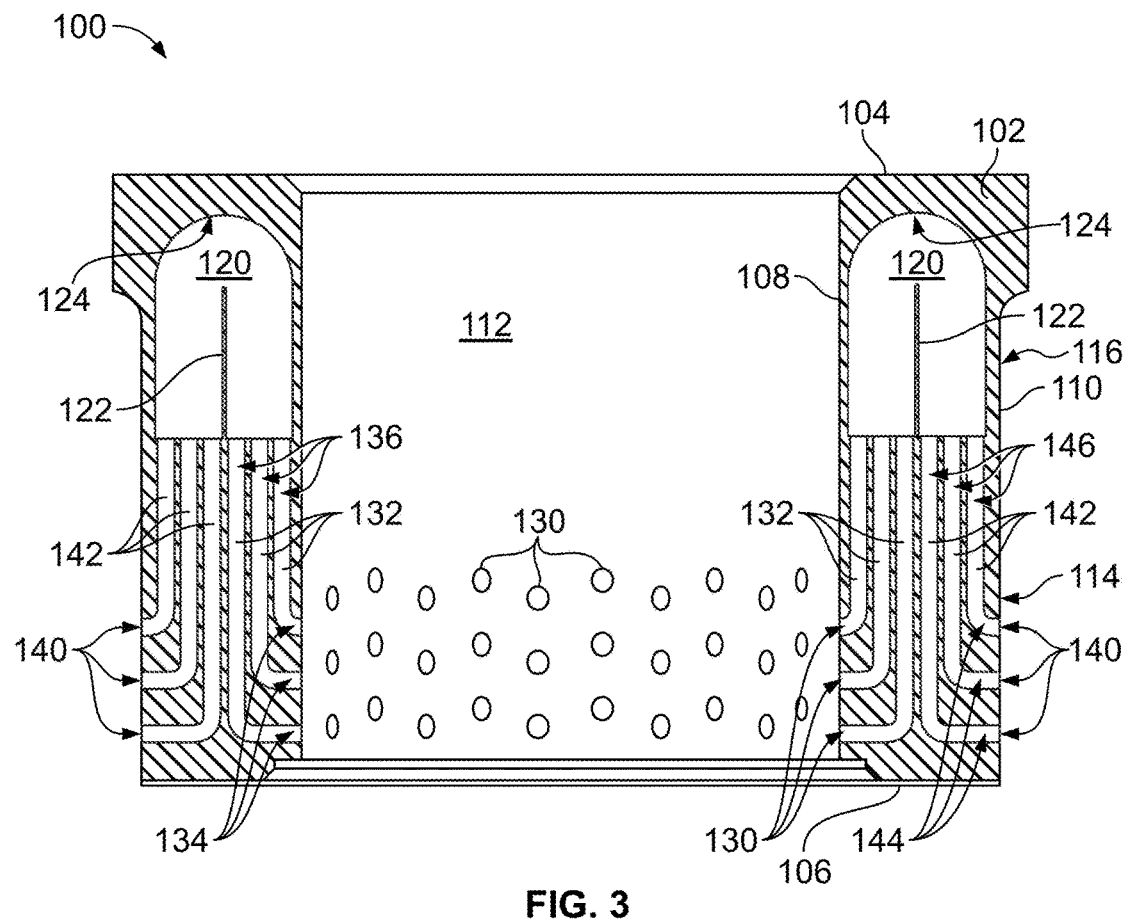
FIG. 3 is a cross-sectional view of the trim assembly of FIG. 2 taken along the line A-A in FIG. 2.

Referring to FIGS. 2-3, one example of a control valve trim assembly 100 is shown that can be used with the control valve 10 described above and shown in FIG. 1. Trim assembly 100 can be manufactured using Additive Manufacturing Technology, such as direct metal laser sintering, full melt powder bed fusion, etc. Using an Additive Manufacturing Technology process, the 3-dimensional design of trim assembly 100 is divided into multiple layers, for example layers approximately 20-50 microns thick. A powder bed, such as a powder based metal, is then laid down representing the first layer of the design and a laser or electron beam sinters together the design of the first layer. A second powder bed, representing the second layer of the design, is then laid down over the first sintered layer and the second layer is sintered together. This continues layer after layer to form the completed trim assembly 100.

Using an Additive Manufacturing Technology process to manufacture trim assemblies for control valves allows the freedom to have plenums within the body of the trim assemblies, produce passages having elongated lengths and various shapes and geometries, and other feature described below, that are not possible using current standard casting or drilling techniques.

As shown in FIGS. 2-3, trim assembly 100 generally includes a circumferential body 102 forming a hollow central bore 112, within which valve plug 26 will slide to control fluid flow through trim assembly 100. Body 102 defines a first end 104, an opposing second end 106, an inner surface 108, and an opposing outer surface 110. Using an Additive Manufacturing Technology, as discussed above, body 102 can be a solid, one-piece unitary body that defines an annular first section 114, which in the orientation shown in FIGS. 2-3 would be a lower portion of trim assembly 100, and an annular second section 116 longitudinally adjacent first section 114, which in the orientation shown in FIGS. 2-3 would be an upper portion of trim assembly 100. Second section 116 or the upper portion of trim assembly 100 can also be called a guide portion and could be used to guide valve plug 26 when moving between open and closed positions. Alternatively, first section 114 and second section 116 of trim assembly 100 could be separate solid parts. For example, first section 114 could be a cage and second section 116 a cage retainer that can be connected the cage/first section 114.

A plenum 120 is formed within body 102, internal to body 102, and is spaced apart from inner surface 108, outer surface 110, first end 104, and second end 106 of body 102. Plenum 120 is preferably annular. Alternatively, plenum 120 could also consist of multiple adjacent, circumferentially extending plenums as well. In the example shown, plenum 120 is formed in second section 116 of body 102, which was typically dead-space that was not utilized in prior designs. In the particular example shown in FIGS. 2-3, a baffle 122 can extend partially into plenum 120 and a surface 124 of plenum 120 can be arcuate to assist in fluid flow through plenum 120, as discussed in more detail below. A multitude a variations can be made to the size of plenum 120, the surface texture, the shape, and the size and shape of baffle 122 to further optimize noise attenuation.

A plurality of first openings 130 are formed in the inner surface 108 of body 102 and can be used as either inlets or outlets for trim assembly 100, depending on if control valve 10 has a "flow up" (flow from inner surface 108 to outer surface 110) or "flow down" (flow from outer surface 110 to inner surface 108) configuration. Each first opening 130 is in fluid communication with plenum 120 through a corresponding first fluid passage 132, which are formed through body 102 and extend between first openings 130 and plenum 120. In the example shown, first openings 130 are formed in first section 114 of body 102 and first fluid passages 132 have a first portion 134 that extends radially through body 102 and a second portion 136 that extends longitudinally through body 102. Pressure of the fluid flow through first fluid passages 132 is reduced via drag from the passage walls. Additional direct pressure drop staging can be also applied with fixed reductions/expansions within first fluid passages 132. First fluid passages 132 can have any cross-sectional shape, varying cross-section shapes and/or sizes, multiple direction changes, etc. to characterize the fluid flow through first fluid passages 132 as desired.

A plurality of second openings 140 are formed in the outer surface 110 of body 102 and can be used as either inlets or outlets for trim assembly 100, depending on if control valve 10 has a "flow up" or "flow down" configuration. Each second opening 140 is in fluid communication with plenum 120 through a corresponding second fluid passage 142, which are formed through body 102 and extend between second openings 140 and plenum 120. In the example shown, second openings 140 are also formed in first section 114 of body 102 and second fluid passages 142 have a first portion 144 that extends radially through body 102 and a second portion 146 that extends longitudinally through body 102. Pressure of the fluid flow through second fluid passages 142 is reduced via drag from the passage walls. Additional direct pressure drop staging can be also applied with fixed reductions/expansions within second fluid passages 142. Second fluid passages 142 can have any cross-sectional shape, varying cross-section shapes and/or sizes, multiple direction changes, etc. to characterize the fluid flow through second fluid passages 142 as desired.

As mentioned above, baffle 122 can be positioned within plenum 120 to assist in fluid flow through plenum 120 and further direct and extend the fluid flow length. Baffle 122 can extend into plenum 120 and be positioned between first fluid passages 132 and second fluid passages 142 to separate the fluid flowing into and out of plenum 120. If plenum 120 is annular, baffle 122 can also be annular or can consist of multiple circumferential baffles positioned within plenum 120 as desired. If plenum 120 consists of multiple adjacent, circumferential plenums, each adjacent plenum can have a separate baffle or multiple baffles as desired. In addition, plenum 120 can also have an arcuate surface 124 that is opposite first and second fluid passages 132, 142 and baffle 122 to further assist in fluid flow through plenum 120 and to reduce areas where eddies and backpressures can form.

In operation, fluid enters first openings 130 or second openings 140, depending on the flow configuration of control valve 10, and flows through either first fluid passages 132 or second fluid passages 142 to plenum 120. Upon entering plenum 120, the fluid from first or second fluid passages 132, 142 expands/dissipates into plenum 120 and coalesces with the fluid from the other active first or second fluid passages 132, 142. The fluid then exits plenum 120 into the other of the first or second fluid passages 132, 142, depending on the flow configuration of control valve 10, further reducing pressure in a similar manner. The fluid then exits trim assembly 100 from the other of first or second openings 130, 140.

Figure 4:
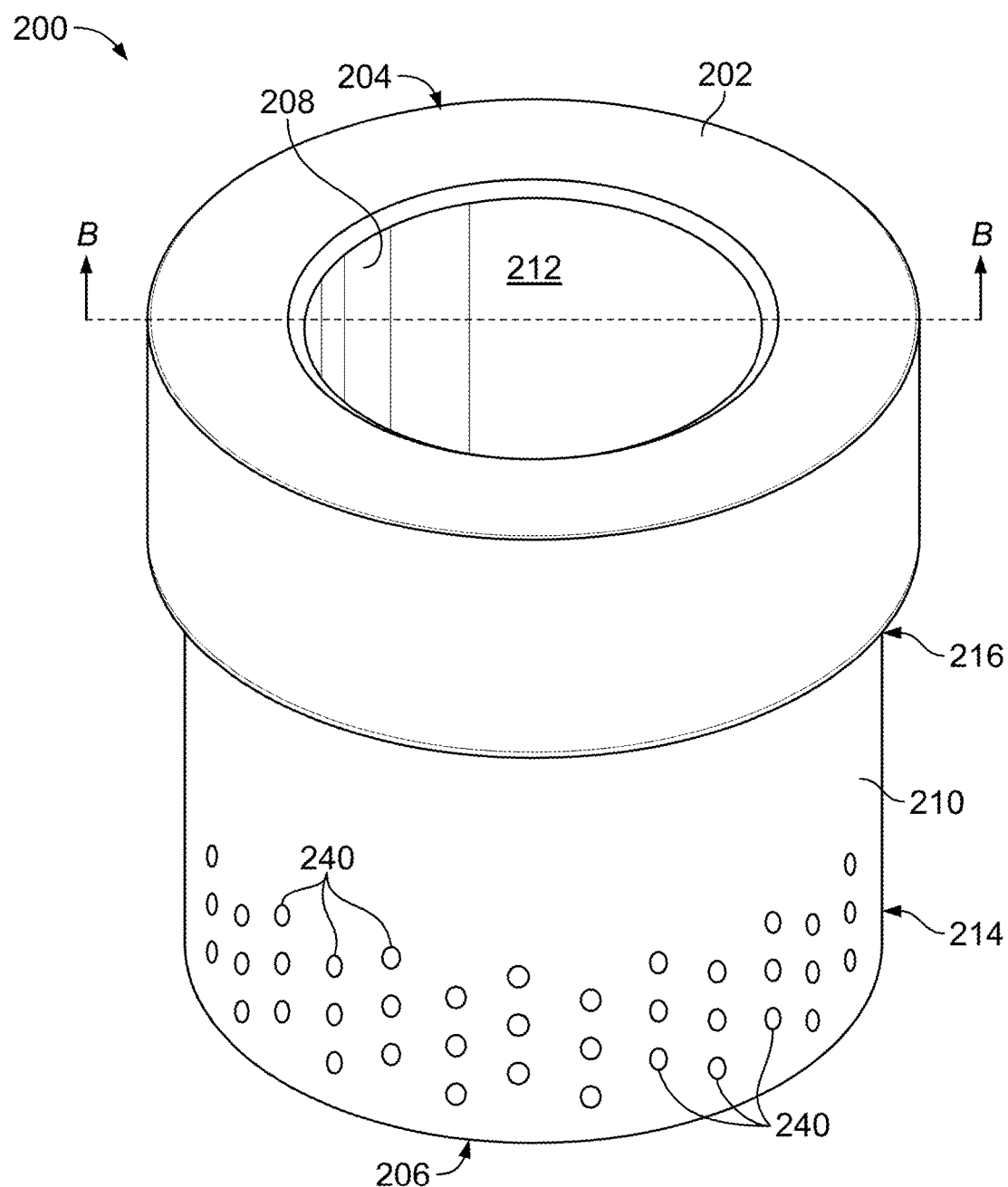
FIG. 4 is a perspective view of a second example trim assembly that can be sued with the control valve of FIG. 1.
Figure 5:
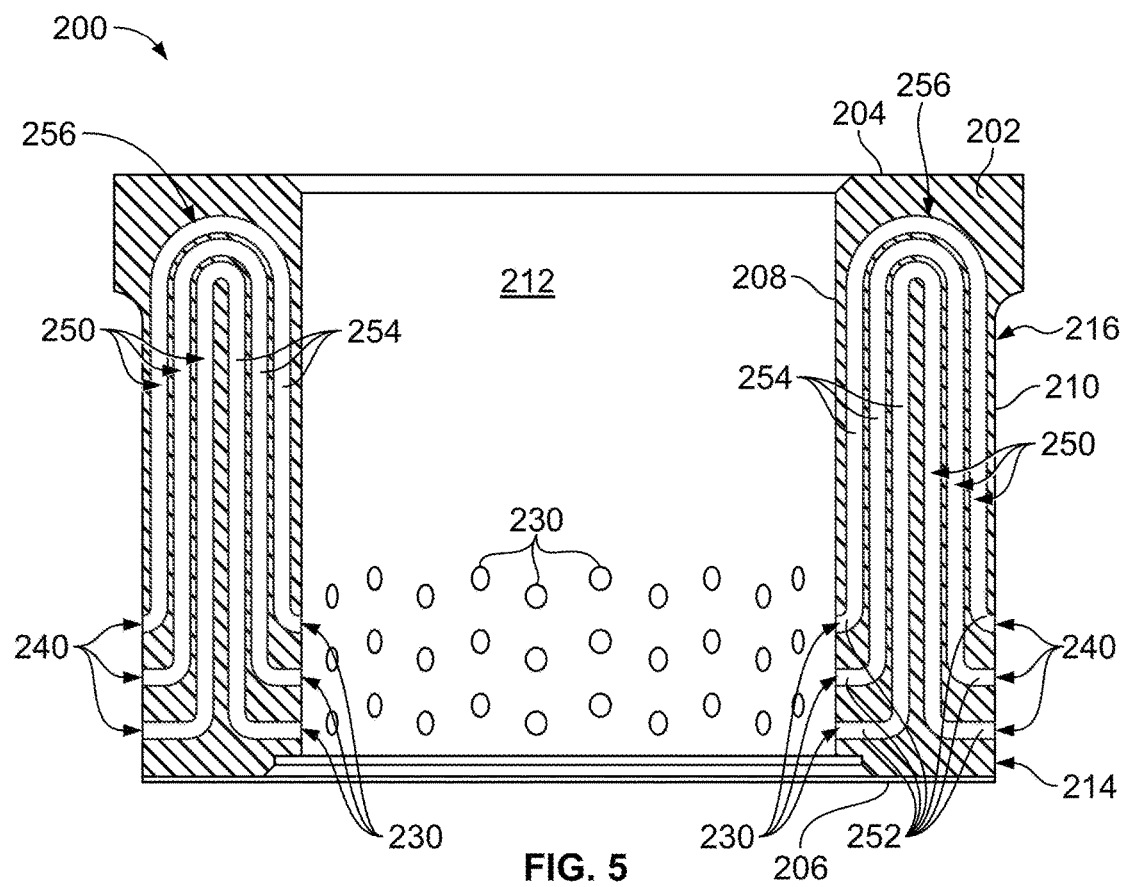
FIG. 5 is a cross-sectional view of the trim assembly of FIG. 4 taken along the line B-B in FIG. 4.

Referring to FIGS. 4-5, a second example of a control valve trim assembly 200 is shown that can be used with the control valve 10 described above and shown in FIG. 1. Trim assembly 200 can also be manufactured using Additive Manufacturing Technology, as described in detail above.

As shown in FIGS. 4-5, trim assembly 200 generally includes a circumferential body 202 forming a hollow central bore 212, within which valve plug 26 will slide to control fluid flow through trim assembly 200. Body 202 defines a first end 204, an opposing second end 206, an inner surface 208, and an opposing outer surface 210. Using an Additive Manufacturing Technology, as discussed above, body 202 can be a solid, one-piece unitary body that defines an annular first section 214, which in the orientation shown in FIGS. 4-5 would be a lower portion of trim assembly 200, and an annular second section 216 longitudinally adjacent first section 214, which in the orientation shown in FIGS. 4-5 would be an upper portion of trim assembly 200. Second section 216 or the upper portion of trim assembly 200 can also be called a guide portion and could be used to guide valve plug 26 when moving between open and closed positions. Alternatively, first section 214 and second section 216 of trim assembly 200 could be separate solid parts. For example, first section 1214 could be a cage and second section 216 a cage retainer that can be connected the cage/first section 214.

A plurality of first openings 230 are formed in inner surface 208 of body 202 and can be used as either inlets or outlets for trim assembly 200, depending on if control valve 10 has a "flow up" (flow from inner surface 208 to outer surface 210) or "flow down" (flow from outer surface 210 to inner surface 208) configuration. A plurality of second openings 240 are formed in the outer surface 210 of body 202 and can be used as either inlets or outlets for trim assembly 100, opposite of first openings 230, depending on if control valve 10 has a "flow up" or "flow down" configuration. In the example shown, first and second openings 230, 240 are formed in first section 213 of body 202.

Each first opening 230 is in fluid communication with a corresponding second opening 240 through a corresponding fluid passage 250, which are formed through body 202 and extend between first openings 230 and second openings 240. In the example shown, fluid passages are formed and pass through both first and second sections 214, 216 of body 202 and have at least one first portion 252 that extends radially through body 202 and at least one second portion 254 that extends longitudinally through body 202. Passages 250 can also have one or more arcuate portions 256 that interconnection various linear portions of passages 250. Pressure of the fluid flow through fluid passages 250 is reduced via drag from the passage walls. Additional direct pressure drop staging can be also applied with fixed reductions/expansions within fluid passages 250. Fluid passages 250 can have any cross-sectional shape, varying cross-section shapes and/or sizes/areas, multiple direction changes, etc. to characterize the fluid flow through fluid passages 250 as desired.

In operation, fluid enters first openings 230 or second openings 240, depending on the flow configuration of control valve 10, and flows through fluid passages 250 to the corresponding first or second opening 230, 240.

While various embodiments have been described above, this disclosure is not intended to be limited thereto. Variations can be made to the disclosed embodiments that are still within the scope of the appended claims.

What is claimed:

1. A control valve trim assembly, comprising:
    a solid, one-piece unitary body having an annular first section and an axially adjacent annular second section, the body defining an inner surface and an outer surface;
    a plenum formed entirely within the second section of the body and spaced apart from the inner surface and the outer surface;
    a plurality of first openings formed in the inner surface of the body, each of the first openings formed in the first section of the body, axially offset from the plenum, and in fluid communication with the plenum via a corresponding first fluid passage formed through the body; and
    a plurality of second openings formed in the outer surface of the body, each of the second openings formed in the first section of the body, axially offset from the plenum, and in fluid communication with the plenum via a corresponding second fluid passage through the body.

2. The control valve trim assembly of claim 1, further comprising a baffle positioned within the plenum, the baffle extending into the plenum between the first and second fluid passages.

3. The control valve trim assembly of claim 1, wherein each of the first and second fluid passages has at least one radially extending portion and at least one longitudinally extending portion.

4. The control valve trim assembly of claim 1, wherein the plenum is annular.

5. The control valve trim assembly of claim 1, wherein at least one surface that defines the plenum, axially opposite the first and second fluid passages, is arcuate.

6. A control valve including the control valve trim assembly of claim 1, the control valve further comprising:
    a valve body having an inlet and an outlet;
    a valve seat positioned in a passageway of the valve body between the inlet and the outlet; and
    a valve plug positioned within the valve body and movable between an opened position and a closed position to modulate a flow of a fluid through the control valve;
    wherein the trim assembly is disposed within the valve body adjacent the valve seat and proximate the valve plug.

7. A control valve trim assembly, comprising:
    a body having an annular first section and an axially adjacent annular second section, the body defining an inner surface and an outer surface;
    a plenum formed entirely within the second section of the body and spaced apart from the inner surface and the outer surface;
    a plurality of first openings formed in the inner surface of the first section of the body, axially offset from the plenum, each of the first openings in fluid communication with the plenum via a corresponding first fluid passage formed through the body; and
    a plurality of second openings formed in the outer surface of the first section of the body, axially offset from the plenum, each of the second openings in fluid communication with the plenum via a corresponding second fluid passage through the body.

8. The control valve trim assembly of claim 7, wherein the body is a solid, one-piece unitary body.

9. The control valve trim assembly of claim 7, wherein the first section comprises a cage and the second section comprises a cage retainer connected to the cage.

10. The control valve trim assembly of claim 7, further comprising a baffle positioned within the plenum, the baffle extending into the plenum between the first and second fluid passages.

11. The control valve trim assembly of claim 7, wherein each of the first and second fluid passages has at least one radially extending portion and at least one axially extending portion.

12. The control valve trim assembly of claim 7, wherein the plenum is annular.

13. The control valve trim assembly of claim 7, wherein at least one surface that defines the plenum, axially opposite the first and second fluid passages, is arcuate.

14. A control valve including the trim assembly of claim 7, the control valve further comprising:
    a valve body having an inlet and an outlet;
    a valve seat positioned in a passageway of the valve body between the inlet and the outlet; and
    a valve plug positioned within the valve body and movable between an opened position and a closed position to modulate a flow of a fluid through the control valve; wherein
        the trim assembly is disposed within the valve body adjacent the valve seat and proximate the valve plug.

* * * * *

UNITED STATES PATENT AND TRADEMARK OFFICE
CERTIFICATE OF CORRECTION

PATENT NO. : 10,443,759 B2
APPLICATION NO. : 15/660249
DATED : October 15, 2019
INVENTOR(S) : Michael W. McCarty It is certified that error appears in the above-identified patent and that said Letters Patent is hereby corrected as shown below:

In the Specification

At Column 2, Lines 48-49, "in inlet" should be -- an inlet --.

At Column 3, Lines 28-29, "in inlet" should be -- an inlet --.

At Column 3, Line 43, "openings formed" should be -- openings are formed --.

At Column 4, Line 57, "feature" should be -- features --.

At Column 5, Line 12, "connected the" should be -- connected to the --.

At Column 5, Line 26, "a" should be -- of --.

At Column 6, Line 55, "first section 1214" should be -- first section 214 --.

At Column 6, Line 56, "connected the" should be -- connected to the --.

At Column 7, Line 2, "first section 213" should be -- first section 214 --.

Signed and Sealed this
Twenty-second Day of February, 2022

Drew Hirshfeld
*Performing the Functions and Duties of the
Under Secretary of Commerce for Intellectual Property and
Director of the United States Patent and Trademark Office*